(12) United States Patent
Okita et al.

(10) Patent No.: US 9,557,731 B2
(45) Date of Patent: Jan. 31, 2017

(54) CONTROL DEVICE OF GEAR PROCESSING MACHINE

(75) Inventors: Tadashi Okita, Yamanashi (JP); Yasusuke Iwashita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1064 days.

(21) Appl. No.: 13/571,803

(22) Filed: Aug. 10, 2012

(65) Prior Publication Data

US 2013/0110278 A1 May 2, 2013

(30) Foreign Application Priority Data

Nov. 2, 2011 (JP) .................................. 2011-241195

(51) Int. Cl.
  G05B 19/18 (2006.01)
  G05B 19/414 (2006.01)
(52) U.S. Cl.
  CPC ......... *G05B 19/4141* (2013.01); *G05B 19/186* (2013.01); *G05B 2219/50216* (2013.01)
(58) Field of Classification Search
  USPC ....................................................... 700/186
  See application file for complete search history.

(56) References Cited

U.S. PATENT DOCUMENTS

| | | | |
|---|---|---|---|
| 5,832,195 A * | 11/1998 | Braun ................. | H04L 12/2602 714/2 |
| 2005/0248304 A1 | 11/2005 | Endou et al. | |
| 2007/0012147 A1 | 1/2007 | Kawai et al. | |

FOREIGN PATENT DOCUMENTS

| | | |
|---|---|---|
| CN | 1696852 A | 11/2005 |
| CN | 1895844 A | 1/2007 |
| DE | 19616855 A1 | 1/1997 |
| EP | 1324167 A2 | 7/2003 |
| JP | 03252704 A | 11/1991 |
| JP | 4-238504 A | 8/1992 |
| JP | 934520 A | 2/1997 |
| JP | 2001325026 A | 11/2001 |
| JP | 2003330510 A | 11/2003 |

OTHER PUBLICATIONS

Japanese Office Action for U.S. Appl. No. 13/571,803 mailed Dec. 18, 2012.
Office Action dated Dec. 13, 2013, corresponds to German patent application No. 102012021047.7.

* cited by examiner

*Primary Examiner* — Carlos Ortiz Rodriguez
(74) *Attorney, Agent, or Firm* — Hauptman Ham, LLP

(57) ABSTRACT

A control device (1) of a gear processing machine has a bus (51) that communicates by directly connecting between a tool axis controller (22) and a workpiece axis controller (12), and, in this control device, the position of a tool axis (40) that is detected by a tool axis position detection sensor (25) is supplied to a workpiece axis controller via a bus, an upper controller (10) supplies a predetermined synchronization ratio and a superimposition command for applying a twisting operation to a workpiece axis controller, and the workpiece axis controller adds a value that is generated by multiplying the position of the tool axis that is supplied via the bus, by the synchronization ratio, and the superimposition command, and generates a motion command for a workpiece axis (30).

10 Claims, 8 Drawing Sheets

CONTROL DEVICE OF GEAR PROCESSING MACHINE

RELATED APPLICATIONS

The present application claims priority from Japanese Application Number 2011-241195, filed Nov. 2, 2011, the disclosure of which is hereby incorporated by reference herein in its entirety.

BACKGROUND OF THE INVENTION

1. Technical Field

The present invention relates to a control device of a gear processing machine having a workpiece axis that holds a workpiece, and a tool axis that has a tool for processing the workpiece.

2. Description of Related Arts

A gear processing machine to process a gear has a workpiece axis that holds a workpiece, and a tool axis that has a tool for processing the workpiece. These workpiece axis and tool axis must be driven in synchronization with each other.

FIG. 8 is a functional block diagram of a control device of a gear processing machine according to related art. In FIG. 8, a slave axis motor 130 drives a workpiece axis 300, and a master axis motor 230 drives a tool axis 400. As illustrated in FIG. 8, the slave axis motor 130 is controlled by a slave axis controller 120, and the master axis motor 230 is controlled by a master axis controller 220. These slave axis controller 120 and master axis controller 220 are connected to an upper controller 100 by buses 110 and 210, respectively. The upper controller 100 controls all the axes.

In addition, a speed detection sensor 140 provided in the slave axis motor 130 detects the rotation speed of the slave axis motor 130 and feeds this back to the slave axis controller 120. Also, a slave axis position detection sensor 150 detects the position of a slave axis (in this case, a workpiece axis 300) and feeds this back to the slave axis controller 120.

Similarly, the speed detection sensor 240 provided in the master axis motor 230 detects the rotation speed of the master axis motor 230 and feeds this back to the master axis controller 220. Also, a master axis position detection sensor 250 detects the position of a master axis (in this case, a tool axis 400) and feeds this back to the master axis controller 220.

In the event a helical gear or the like is processed by the gear processing machine illustrated in FIG. 8, it is necessary to apply twisting operations. In such cases, a synchronization command for allowing the workpiece axis 300 and the tool axis 400 to synchronize with each other, and a superimposition command for applying twisting operations, are combined in the upper controller 100, and supplied to the slave axis controller 120.

In FIG. 8, the position feedback data of the tool axis 400 that is detected by the master axis position detection sensor 250 is supplied to the upper controller 100, via the master axis controller 220 and a bus 210. Then, the upper controller 100 establishes synchronization by supplying this data to the slave axis controller 120 via the bus 110. Likewise, in Japanese Unexamined Patent Publication No. 4-238504, position feedback of a tool axis is supplied to an upper controller, and a workpiece axis is operated so as to synchronize with the position feedback.

FIG. 9 is another functional block diagram of a control device of a gear processing machine according to related art. In FIG. 9, a branch circuit 190 is provided to connect the master axis position detection sensor 250 and the slave axis controller 120. In FIG. 9, the position feedback data of a tool axis 400 that is detected by the master axis position detection sensor 250 is supplied to the branch circuit 190. Then, the branch circuit 190 branches and supplies the data to the controller 220 and slave axis controller 120, and, by this means, establishes synchronization.

However, with the gear processing machine illustrated in FIG. 8, in order to transfer the position feedback data of the master axis (tool axis) to the slave axis controller 120, it is necessary to pass the upper controller 100. Consequently, transmission delay is produced with the master axis (tool axis) position feedback data, and this makes synchronization of high accuracy difficult.

In addition, since the gear processing machine illustrated in FIG. 9 requires a branch circuit 190, the cost of the gear processing machine increases accordingly. Furthermore, the relationship between the master axis (tool axis 400) and the slave axis (workpiece axis 300) is electrically fixed, on a one by one basis, and it is therefore difficult to change the slave axis to another axis (not illustrated). Moreover, in FIG. 9, it is not possible to synchronize a plurality of slave axes with one master axis (tool axis 400).

The present invention has been made in view of the above, and it is therefore an object of the present invention to provide a control device of a gear processing machine, that reduces transmission delay and that allows one or a plurality of slave axes to synchronize with one master axis, without using a branch circuit.

SUMMARY OF THE INVENTION

To achieve the above object, according to the first mode, a control device of a gear processing machine includes: a tool axis motor that drives a tool axis; a tool axis controller that controls the tool axis motor; a tool axis position detection sensor that detects a position of the tool axis; a workpiece axis motor that drives a workpiece axis; a workpiece axis controller that controls the workpiece axis motor; an upper controller that is connected to the tool axis controller and the workpiece axis controller; and a bus that directly connects the tool axis controller and the workpiece axis controller to communicate, and, in this control device, the position of the tool axis that is detected by the tool axis position detection sensor is supplied to the workpiece axis controller via the bus; the upper controller supplies a predetermined synchronization ratio and a superimposition command for applying a twisting operation to the work axis controller; and the workpiece axis controller adds a value that is generated by multiplying the position of the tool axis supplied via the bus by the synchronization ratio, and the superimposition command, and generates a motion command for the workpiece axis.

To achieve the above object, according to a second mode, a control device of a gear processing machine includes: a tool axis motor that drives a tool axis; a tool axis controller that controls the tool axis motor; a tool axis position detection sensor that detects the position of the tool axis; a plurality of workpiece axis motors that drive a plurality of workpiece axes; a plurality of workpiece axis controllers that control the plurality of workpiece axis motors; a single bus that directly connects the tool axis controller and the plurality of workpiece axis controllers to communicate; and an upper controller that is connected to the tool axis controller and the plurality of workpiece axis controllers, and, in this control device, the upper controller includes a designating unit that designates one workpiece axis controller from the plurality of workpiece axis controllers; the position of the tool axis that is detected by the tool axis position detection sensor is supplied to the one workpiece axis controller that is designated by the designating unit, via the bus; the upper controller supplies a predetermined synchronization ratio and a superimposition command for applying a twisting operation to the one workpiece axis controller; and the one workpiece axis controller adds a value that is generated by multiplying the position of the tool axis supplied via the bus by the synchronization ratio, and the superimposition command, and generates a motion command for a workpiece axis corresponding to the one workpiece axis controller.

To achieve the above object, according to a third mode, a control device of a gear processing machine includes: a tool axis motor that drives a tool axis; a tool axis controller that controls the tool axis motor; a tool axis position detection sensor that detects a position of the tool axis; a plurality of workpiece axis motors that drive a plurality of workpiece axes; a plurality of workpiece axis controllers that control the plurality of workpiece axis motors; an upper controller that is connected to the tool axis controller and the plurality of workpiece axis controllers; and a single bus that directly connects the tool axis controller and the plurality of workpiece axis controllers to communicate, and, in this control device, two workpiece axis controllers among the plurality of workpiece axis controllers are used to hold one workpiece together; the position of the tool axis detected by the tool axis position detection sensor is supplied to the two workpiece axis controllers via the bus; and the two workpiece axis controllers add a value that is generated by multiplying the position of the tool axis supplied via the bus by the synchronization ratio, and the superimposition command, and generate a motion command for a workpiece axis corresponding to the two workpiece axis controllers.

The objects, features, and characteristics of this invention other than those set forth above will become apparent from the description given herein below with reference to preferred embodiments illustrated in the accompanying drawings.

DETAILED DESCRIPTION

Hereinafter, embodiments of the present invention will be described below in detail with reference to the accompanying drawings. In the following drawings, the same members are assigned the same reference codes. The scale in these drawings is changed as appropriate for ease of explanation.

Figure 1:
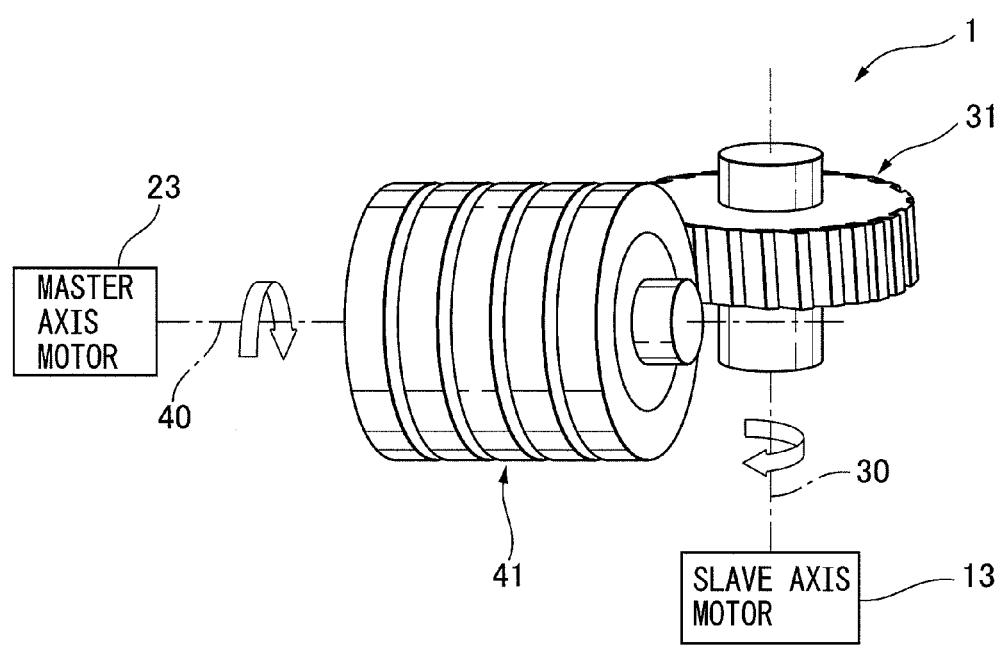
FIG. 1 is a conceptual diagram of a control device of a gear processing machine based on the present invention.

FIG. 1 is a conceptual diagram of a control device of a gear processing machine based on the present invention. A control device 1 of the gear processing machine mainly includes a master axis motor 23 that rotates a tool 41 (for example, a whetstone, cutter, and/or the like), and a slave axis motor 13 that rotates a workpiece 31 (for example, a gear to be processed, a helical gear, and/or the like). Note that, in the present specification, the rotation axis of the tool 41 will be referred to as "tool axis 40," and the rotation axis of the workpiece 31 will be referred to as "workpiece axis 30." In FIG. 1, these tool axis 40 and workpiece axis 30 form a predetermined angle (for example, 90 degrees).

Figure 2:
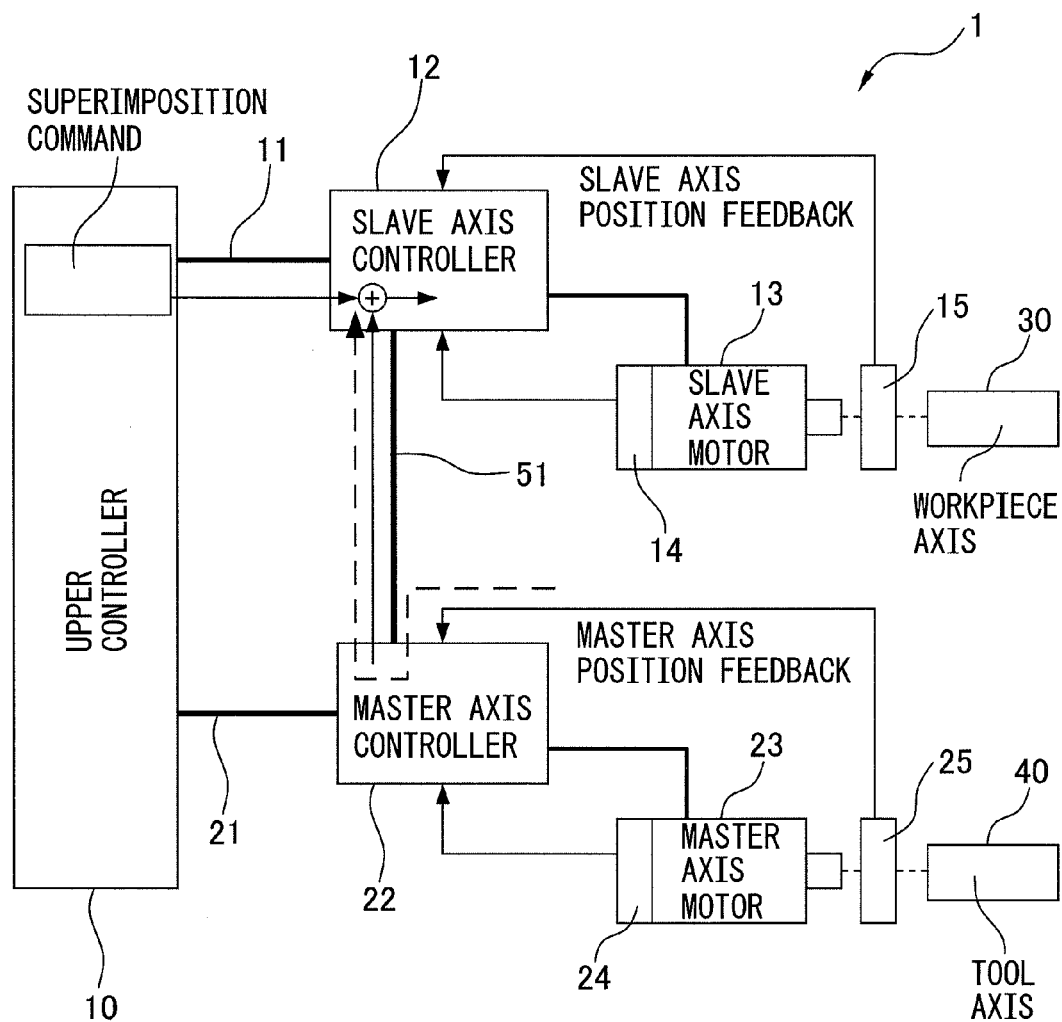
FIG. 2 is a functional block diagram of a control device of a gear processing machine based on the first embodiment of the present invention.

FIG. 2 is a functional block diagram of a control device of a gear processing machine of the first embodiment of the present invention. As illustrated in FIG. 2, the slave axis motor 13 drives the workpiece axis 30, and also the master axis motor 23 drives the tool axis 40. As illustrated in FIG. 2, the slave axis motor 13 is controlled by a slave axis controller 12 (workpiece axis controller), and the master axis motor 23 is controlled by a master axis controller 22 (tool axis controller). These slave axis controller 12 and master axis controller 22 are connected to the upper controller 10 by buses 11 and 21, respectively. The upper controller 10 controls all the axes.

In this connection, the upper controller 10 of the control device 1 of the gear processing machine generates a synchronization command for synchronizing the workpiece axis 30 and tool axis 40 with each other. Then, in the event a tooth part such as a helical gear that is twisted in an inclined direction with respect to the workpiece axis 30, is formed, the upper controller 10 generates correction with respect to the twist as a superimposition command, in addition to the synchronization command.

Furthermore, the speed detection sensor 14 provided in the slave axis motor 13 detects the rotation speed of the slave axis motor 13 and feeds this back to the slave axis controller 12. Also, the slave axis position detection sensor 15 detects the position of the slave axis (in this case, workpiece axis 30) and feeds this back to the slave axis controller 12.

Similarly, the speed detection sensor 24 provided in the master axis motor 23 detects the rotation speed of the master axis motor 23 and feeds this back to the master axis controller 22. Also, the master axis position detection sensor 25 detects the position of the master axis (in this case, the tool axis 40) and feeds this back to the master axis controller 22.

The ratio of the number of rotations of the tool axis 40 and the number of rotations of the workpiece axis 30 is set to a predetermined value in the above controller, and that value is transmitted from the upper controller 10 to the slave axis controller 12.

As illustrated in FIG. 2, according to the present invention, the bus 51 connects the slave axis controller 12 and the master axis controller 22 directly. The bus 51 is a communication bus to allow high speed data communication between the two controllers 12 and 22. The slave axis controller 12 multiplies the master axis position feedback data that is received from the master axis controller 22 via this bus 51, by the ratio of the numbers of rotations of the tool axis 40 and the workpiece axis 30, and drives the slave axis motor 13, thereby driving the workpiece axis 30 in synchronization with the tool axis 40.

Figure 3:
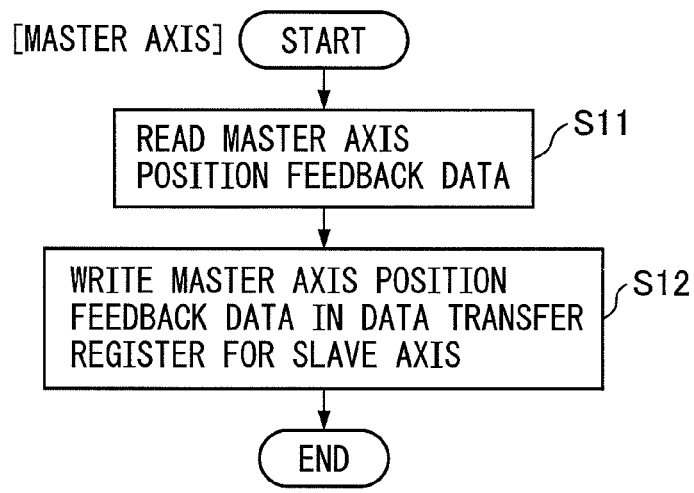
FIG. 3 is a flowchart illustrating operations of a master axis of a control device of a gear processing machine based on the present invention.
Figure 4:
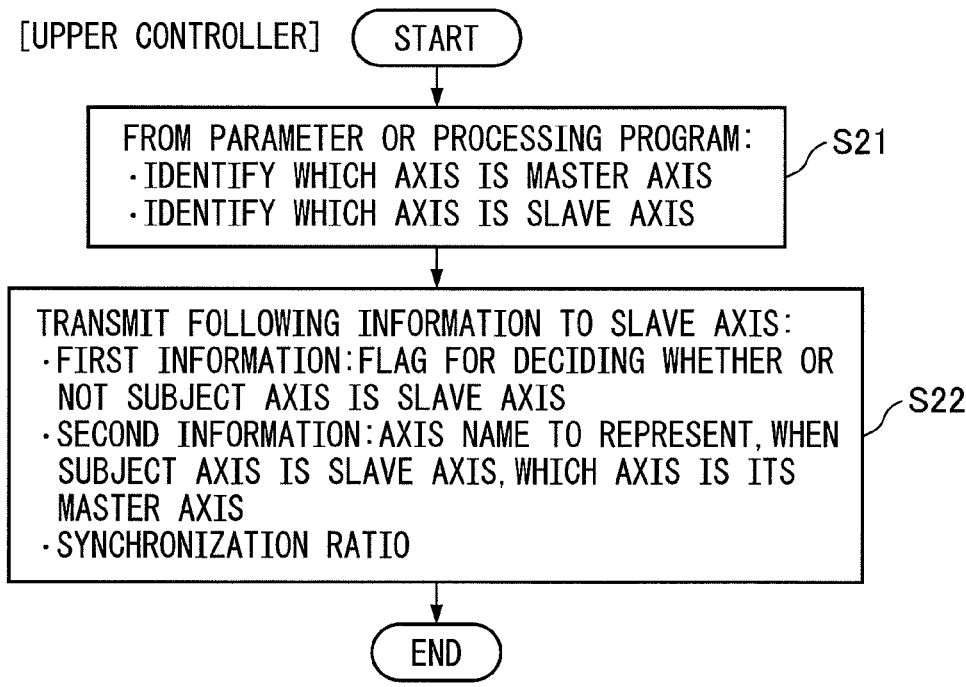
FIG. 4 is a flowchart illustrating operations of an upper controller of a control device of a gear processing machine based on the present invention.
Figure 5:
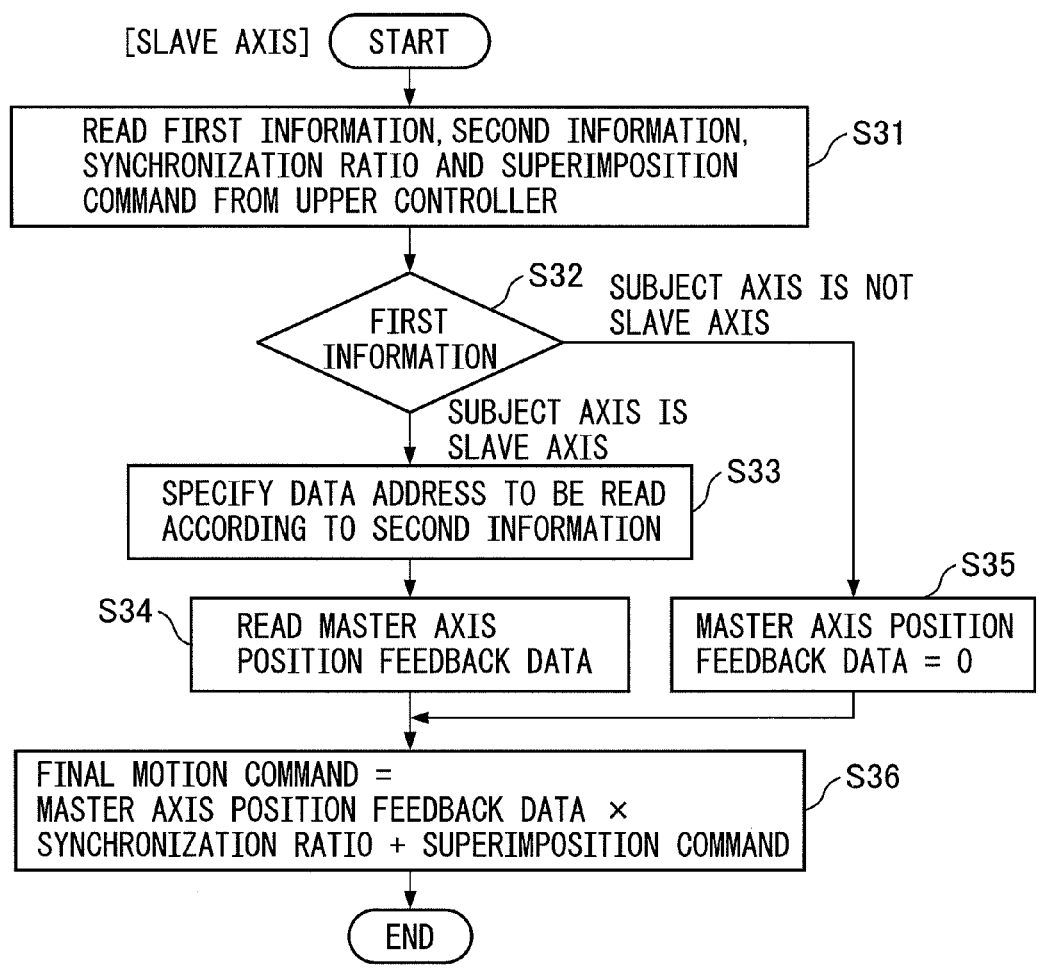
FIG. 5 is a flowchart illustrating operations of a slave axis of a control device of a gear processing machine based on the present invention.

FIG. 3 to FIG. 5 are flowcharts illustrating operations of the master axis, upper controller and slave axis of a control device of a gear processing machine, based on the present invention. Hereinafter, operations of the first embodiment illustrated in FIG. 2 will be described with reference to FIG. 3 to FIG. 5.

With the first embodiment, the master axis is the tool axis 40 and the slave axis is the workpiece axis 30. First, with reference to FIG. 3, operations of the master axis (hereinafter referred to as "tool axis 40") will be described. In step S11 of FIG. 3, a master axis position detection sensor 25 detects the position of the tool axis 40 and feeds this back to a master axis controller 22. The master axis controller 22 reads the position data of the tool axis 40 that is fed back.

In step S12, the position feedback data of the tool axis 40 is written in a data transfer register for the slave axis. This register is not illustrated but is provided in the master axis controller 22.

Operations of an upper controller 10 will be described with reference to FIG. 4. In step S21 of FIG. 4, the upper controller 10 reads parameters or processing program stored in a storage unit (not illustrated), and identifies which axis is the master axis and which axis the slave axis. As described earlier, with the first embodiment illustrated in FIG. 2, the master axis is the tool axis 40 and the slave axis is the workpiece axis 30.

In step S22, the first information, second information and predetermined synchronization ratio are transmitted to the controller 12 corresponding to the identified slave axis, via a bus 11. The first information is a flag for deciding whether or not the subject axis is a slave axis. The second information is an axis name that represents, when the subject axis is a slave axis, which axis is the master axis to the slave axis. With the first embodiment illustrated in FIG. 2, a single workpiece axis 30 alone is provided, so that the first information and second information are automatically determined.

With reference to FIG. 5, operations of the slave axis (workpiece axis 30) will be described. In step S31 of FIG. 5, the workpiece axis 30 reads the first information, second information, synchronization ratio and superimposition command, from the upper controller 10. In step S32, the slave axis controller 12 determines the content of the first information. Then, the step moves on to step S33 in the event the subject axis is a slave axis, or the step moves on to step S35 in the event the subject axis is not a slave axis. With the first embodiment illustrated in FIG. 2, only one slave axis (workpiece axis 30) is provided, so that the process always moves on to step S33.

In step S33, the slave axis controller 12 reads second information from the upper controller 10. The master axis data address to be read is specified from the second information. In step S34, the slave axis controller 12 reads the position data of the tool axis 40, detected by the master axis position detection sensor 25.

As illustrated in FIG. 2, the slave axis controller 12 reads the position data of the tool axis 40, detected by the master axis position detection sensor 25, directly from the master axis controller 22, via the bus 51. In other words, with the present invention, the position data of the tool axis 40 that is detected by the master axis position detection sensor 25 is supplied directly to the slave axis controller 12, without passing the upper controller 10. Therefore, it should be understood that, with the present invention, transmission delay can be reduced.

In step S36, the slave axis controller 12 adds a superimposition command to the value given by multiplying the position data of the tool axis 40 by the synchronization ratio, and generates a final motion command for the workpiece axis 30. As can be seen from FIG. 2, the motion command that is generated is supplied to the slave axis motor 13, and the slave axis motor 13 drives the workpiece axis 30 based on that motion command. By this means, it is possible to drive the workpiece axis 30 in synchronization with the tool axis 40. The motion command includes a superimposition command, so that it is possible to process a helical gear and/or the like adequately.

In this way, with the present invention, the position of the tool axis 40 is transmitted directly to the slave axis controller 12, via the bus 51, without passing the upper controller 10. Consequently, it is possible to reduce transmission delay, and, without using a branch circuit, synchronize one workpiece axis 30 with one tool axis 40. As a result of this, it should be understood that, the accuracy of synchronization between the tool axis 40 and the workpiece axis 30 can be improved.

Figure 6:
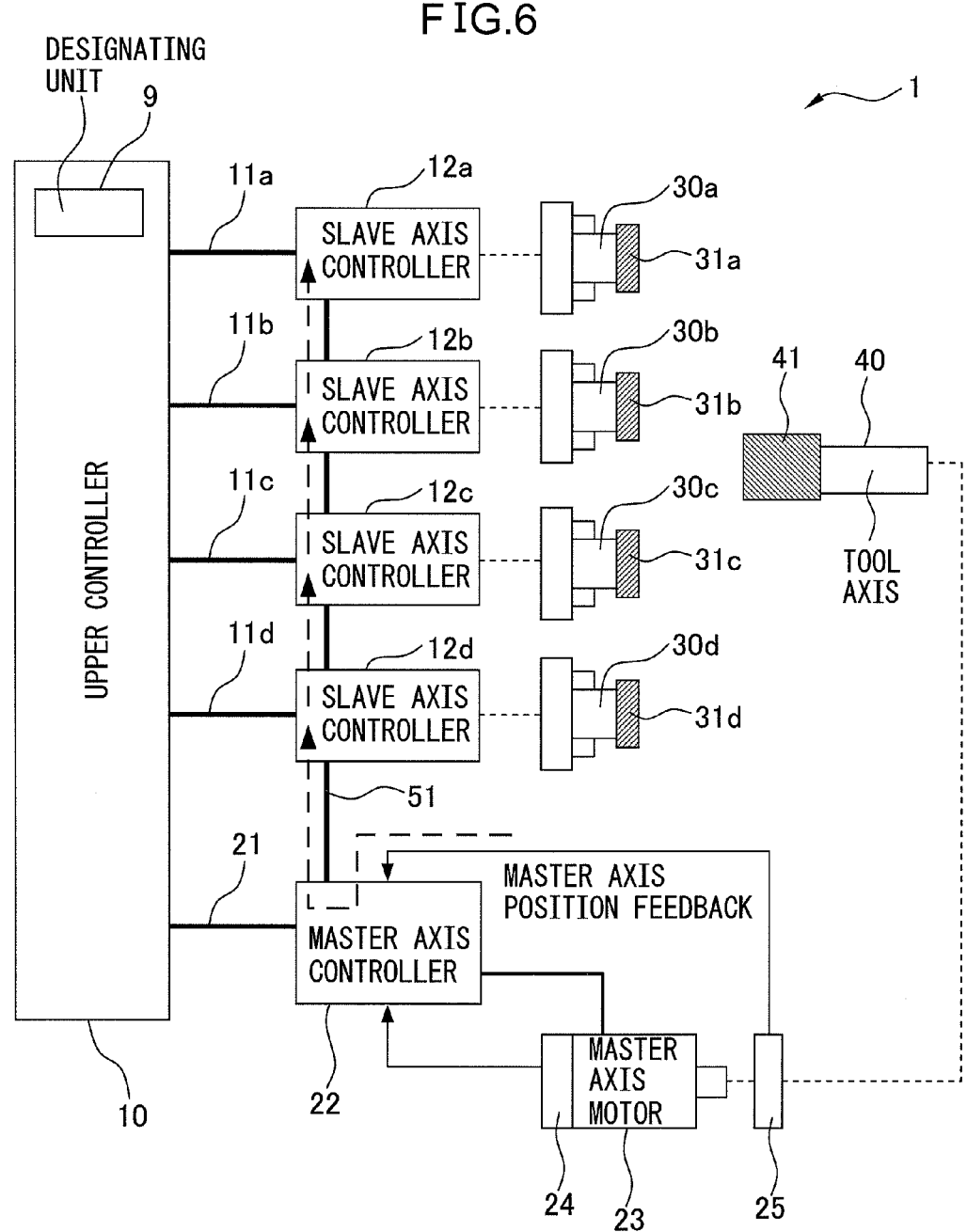
FIG. 6 is a functional block diagram of a control device of a gear processing machine based on a second embodiment of the present invention.

Furthermore, FIG. 6 is a functional block diagram of a control device of a gear processing machine based on a second embodiment of the present invention. In FIG. 6, a plurality of slave axis controllers 12a to 12d are illustrated. Although these slave axis controllers 12a to 12d have the same configuration as the slave axis controller 12 illustrated in FIG. 2 and each have a slave axis motor 13, a speed detection sensor 14, and a slave axis position detection sensor 15, for ease of explanation, these are not illustrated.

In addition, with the second embodiment, as illustrated in FIG. 6, the bus 51 extends from the master axis controller 22, penetrating the slave axis controllers 12a to 12d. Then, in the workpiece axes 30a to 30d for the slave axis controllers 12a to 12d, respectively, workpieces 31a to 31d (for example, gears, helical gears, etc.) are provided. Also, in the tool axis 40, a tool 41 (for example, a whetstone, a cutter, etc.) is provided. The configuration illustrated in FIG. 6 is used in the event a plurality of workpiece axes 30a to 30d are switched on a selective basis and processed.

With the embodiment illustrated in FIG. 6, the control device 1 of the gear processing machine includes a plurality of slave axis controllers 12a to 12d. Consequently, it is necessary to designate the workpiece axis to be processed by the tool 41 of the tool axis 40, from a plurality of workpiece axes 30a to 30d. The upper controller 10 includes a designating unit 9, and designates one workpiece axis from a plurality of workpiece axes 30a to 30d, in the following steps.

Referring back to FIG. 5, the operation of designating the workpiece axis by the designating unit 9 will be described. In step S32 of FIG. 5, the slave axis controllers 12a to 12d each determine the content of the first information that is read from the upper controller 10. With the second embodiment, the first information related to the workpiece axis 30a includes a flag to represent that the workpiece axis 30a is a slave axis, and the first information related to the workpiece axes 30b to 30d includes a flag to represent that the workpiece axes 30b to 30d are not slave axes. Then, the step moves on to step S33 in the event the subject axis is a slave axis, or the step moves on to step S35 in the event the subject axis is not a slave axis.

A slave axis controller to determine that the subject axis is a slave axis (for example, the slave axis controller 12a)

generates the final motion command for the workpiece axis 30, following steps S33, S34 and S36, as described earlier. In this case, position data of the tool axis 40, detected by the master axis position detection sensor 25, is also directly transmitted from the master axis controller 22 to the slave axis controller 12a, via the bus 51. On the contrary, slave axis controllers to determine that the subject axis is not a slave axis (for example, the slave axis controllers 12b to 12d) in step S32 make the position data of the tool axis 40 that is detected by the master axis position detection sensor 25 zero, in step S35.

In other words, in the event the subject axis is determined not to be a slave axis, the position data of the tool axis 40 is not input in the slave axis controllers 12b to 12d. In this case, only a command (not illustrated) for motion of the subject axis not in synchronization with the master axis is input from the upper controller 10, to the slave axis controllers 12b to 12d, via the corresponding buses 11b to 11d, respectively. Alternately, a command not driving the workpiece axes 30b to 30d of the slave axis controllers 12b to 12d may be input to the slave axis controllers 12b to 12d. The other steps are the same as described earlier and therefore will not be described.

With the second embodiment illustrated in FIG. 6, it should be understood that, since the position data of the tool axis 40 that is detected by the master axis position detection sensor 25 is transmitted directly to the slave axis controller 12a via the bus 51, the same advantages as described above can be achieved. Furthermore, with the second embodiment, it is possible to synchronize one workpiece axis 30a, among a plurality of workpiece axes 30a to 30d, with one tool axis 40. Furthermore, it is also possible to easily change the workpiece axis to be subject to synchronization by the tool axis 40, depending on the processing program or parameters.

Also, although not illustrated in the drawings, in the event of a configuration having a plurality of tool axes 40 and a single workpiece axis 30, it is possible to designate a tool axis 40 to be subject to synchronization by the workpiece axis 30 based on second information. Consequently, it should be understood that, even in the event of a configuration having a plurality of tool axes 40 and a single workpiece axis 30, it is possible to easily designate the tool axis 40 to be subject to synchronization by the work axis 30.

Figure 7:
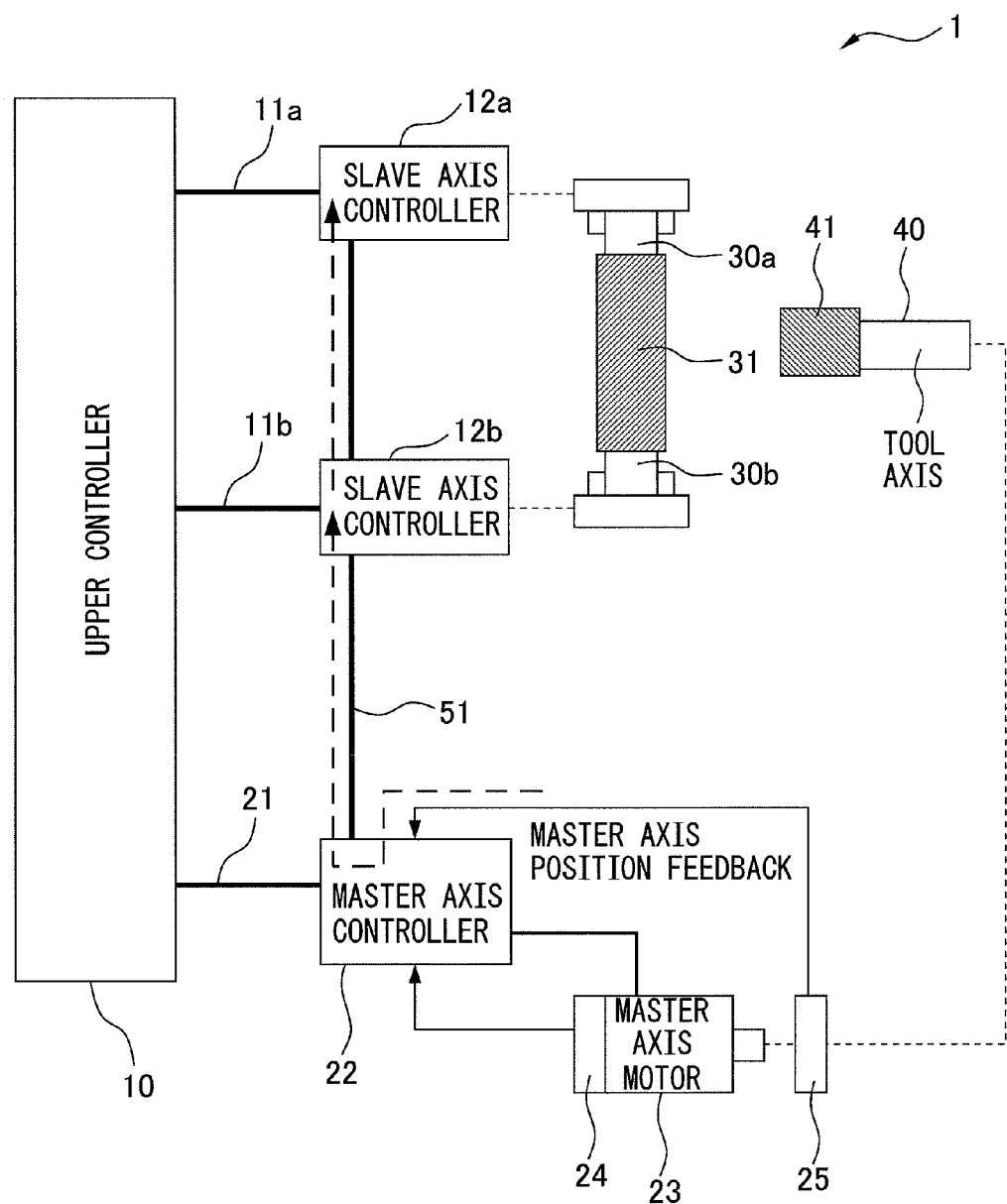
FIG. 7 is a functional block diagram of a control device of a gear processing machine based on a third embodiment of the present invention.
Figure 8:
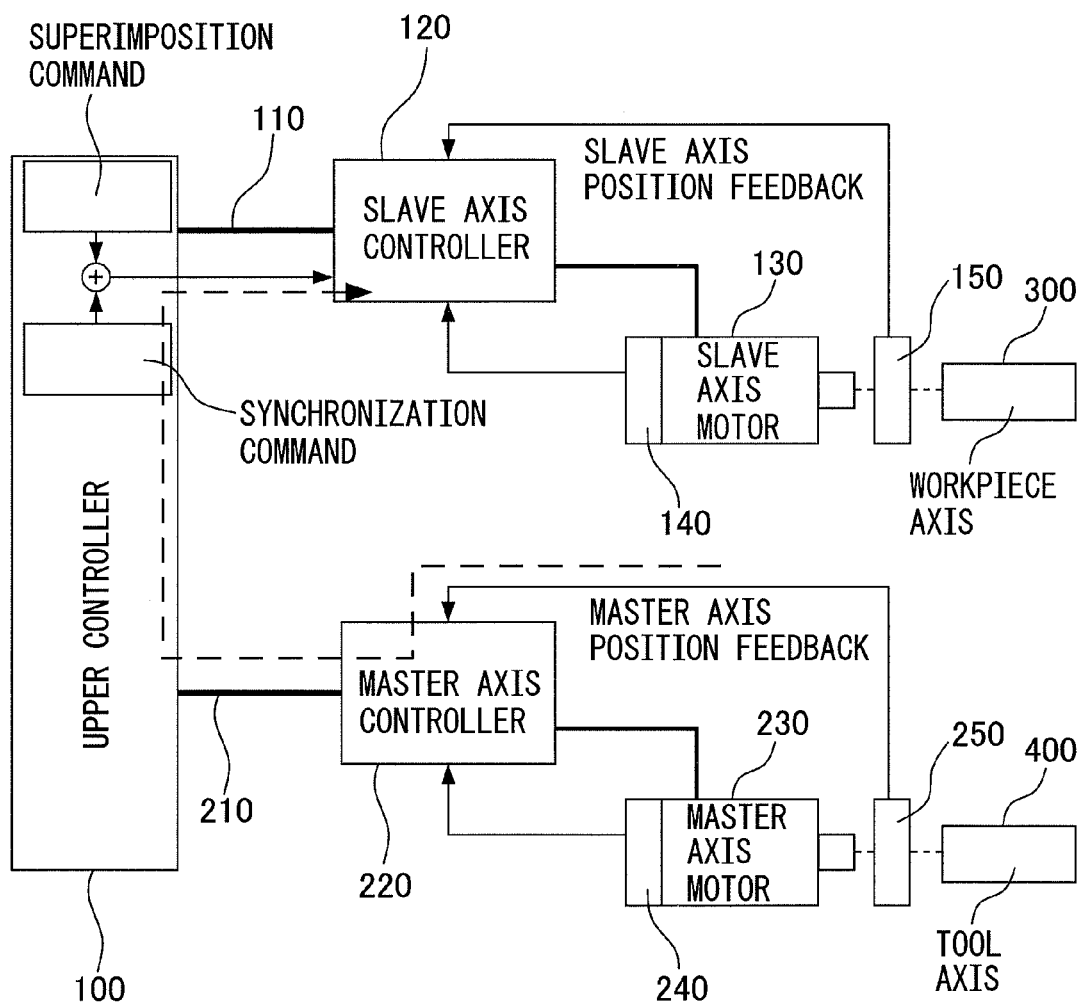
FIG. 8 is a functional block diagram of a control device of a gear processing machine according to related art.
Figure 9:
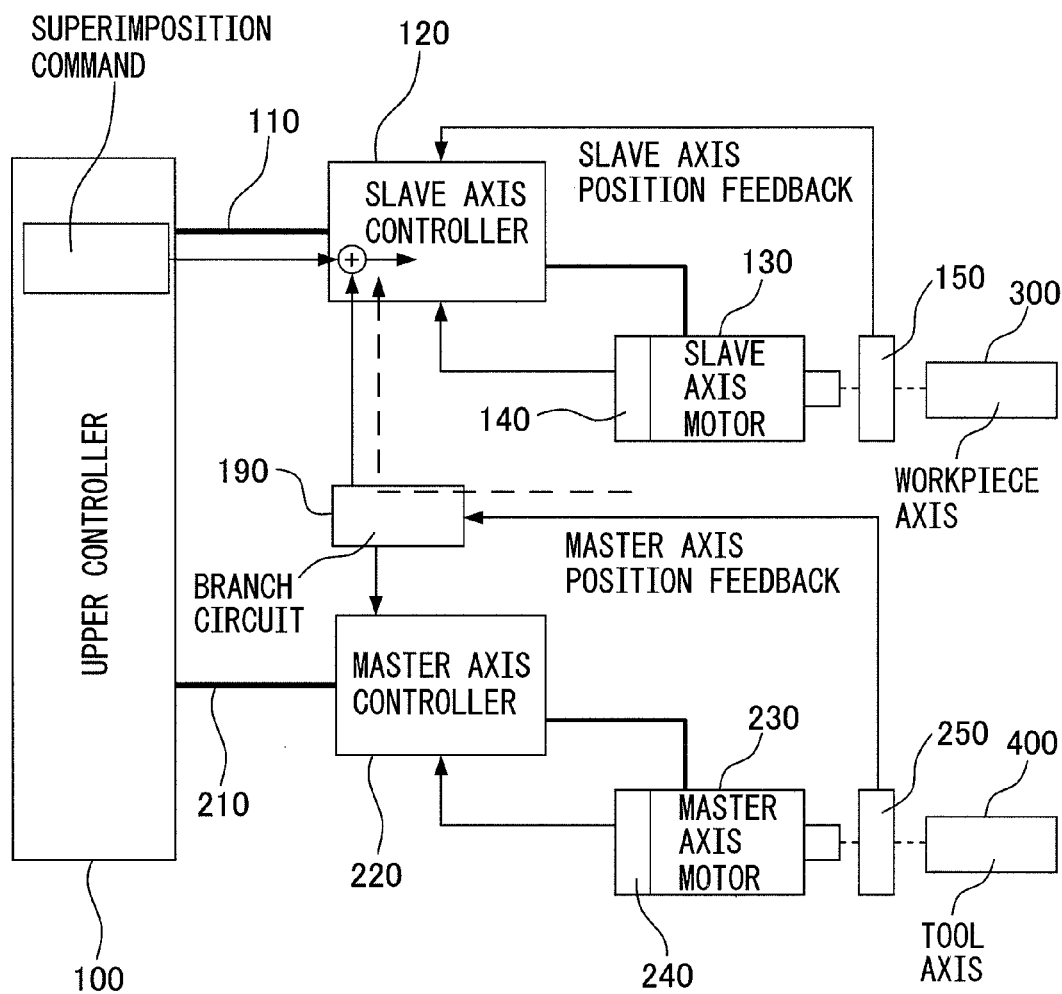
FIG. 9 is another functional block diagram of a control device of a gear processing machine according to related art.

Furthermore, FIG. 7 is a functional block diagram of a control device of a gear processing machine based on a third embodiment of the present invention. FIG. 7 illustrates two slave axis controllers 12a and 12b. These slave axis controllers 12a and 12b each likewise have a slave axis motor 13, a speed detection sensor 14 and a slave axis position detection sensor 15. Furthermore, the bus 51 extends from the master axis controller 22, penetrating the slave axis controllers 12a and 12b.

Furthermore, in FIG. 7, one workpiece 31 is held by the workpiece axis 30a that is associated with a slave axis controller 12a, and the workpiece axis 30b that is associated with a slave axis controller 12b. In other words, with the third embodiment illustrated in FIG. 7, a single workpiece is held by a plurality of workpiece axes. This configuration is employed in the event, for example, the drive torque from one slave axis motor is insufficient, or in the event both edges of a comparatively long workpiece are held for processing. Note that it naturally follows that a configuration to support a single workpiece by three or more workpiece axes is also possible.

With the embodiment illustrated in FIG. 7, it is necessary to synchronize two workpiece axes 30a and 30b with one tool axis 40. Consequently, referring back to FIG. 5, in step S32, the slave axis controllers 12a and 12b both determine the content of the first information that is read from the upper controller 10. In this case, the workpiece axes 30a and 30b are both slave axes. Then, the position data of the tool axis 40 that is detected by the master axis position detection sensor 25 is directly transmitted from the master axis controller 22, to both of the slave axis controllers 12a and 12b, via the bus 51. Consequently, the slave axis controllers 12a and 12b both generate a final motion command for the workpiece axes 30a and 30b, following steps S33, S34 and S36, as described earlier.

With the third embodiment illustrated in FIG. 7, it should be understood that, since the position data of the tool axis 40 is transmitted directly from the master axis controller 22 to both of the slave axis controllers 12a and 12b, via the bus 51, it is possible to achieve the same advantages as described above. Furthermore, with the third embodiment, it is possible to easily synchronize two workpiece axes 30a and 30b with one tool axis 40. In other words, with the third embodiment, even when a configuration is employed in which two workpiece axes 30a and 30b hold a workpiece 31, it is possible to synchronize two workpiece axes 30a and 30b with one tool axis 40.

EFFECTS OF THE INVENTION

According to the first mode, the position of a tool axis is transmitted directly to a workpiece axis controller via a bus. Consequently, it is possible to reduce transmission delay, and, without using a branch circuit, synchronize one slave axis (workpiece axis) with one master axis (tool axis).

According to the second mode, the position of a tool axis is transmitted directly to the designated one workpiece axis controller via a bus, without passing an upper controller. Consequently, it is possible to reduce transmission delay, and, without using a branch circuit, synchronize one slave axis (workpiece axis) among a plurality of slave axes (workpiece axes) with one master axis (tool axis).

According to the third mode, the position of a tool axis is directly transmitted to two workpiece axis controllers that are used to hold the workpiece, via a bus. Consequently, it is possible to reduce transmission delay, and, without using a branch circuit, synchronize two slave axes (workpiece axes) with one master axis (tool axis).

Although the present invention has been described using typical embodiments, a person skilled in the art should understand that the above-described changes, and various other changes, omissions, and additions are possible without departing from the scope of the present invention.

The invention claimed is:

1. A control device of a gear processing machine, the control device comprising:
   a tool axis motor that drives a tool axis;
   a tool axis controller that controls the tool axis motor;
   a tool axis position detection sensor that detects a position of the tool axis;
   a workpiece axis motor that drives a workpiece axis;
   a workpiece axis controller that controls the workpiece axis motor;
   an upper controller that is connected to the tool axis controller and the workpiece axis controller; and
   a bus that directly connects the tool axis controller and the workpiece axis controller to communicate,
   wherein
   the position of the tool axis that is detected by the tool axis position detection sensor is supplied to the workpiece axis controller via the bus, the upper controller supplies a predetermined synchronization ratio and a superimposition command for applying a twisting operation to the workpiece axis controller, the workpiece axis controller adds a value that is generated by multiplying the position of the tool axis supplied via the bus by the synchronization ratio, and the superimposition command, and generates a motion command for the workpiece axis, the upper controller is configured to transmit first information to the workpiece axis controller, and the first information is a flag indicating whether or not the workpiece axis is a slave axis.

2. A control device of a gear processing machine, the control device comprising:
- a tool axis motor that drives a tool axis;
- a tool axis controller that controls the tool axis motor;
- a tool axis position detection sensor that detects the position of the tool axis;
- a plurality of workpiece axis motors that drive a plurality of workpiece axes;
- a plurality of workpiece axis controllers that control the plurality of workpiece axis motors;
- a single bus that directly connects the tool axis controller and the plurality of workpiece axis controllers to communicate; and
- an upper controller that is connected to the tool axis controller and the plurality of workpiece axis controllers, wherein the upper controller includes a designating unit that designates one workpiece axis controller from the plurality of workpiece axis controllers, the position of the tool axis that is detected by the tool axis position detection sensor is supplied to the one workpiece axis controller that is designated by the designating unit, via the bus, the upper controller supplies a predetermined synchronization ratio and a superimposition command for applying a twisting operation to the one workpiece axis controller, the one workpiece axis controller adds a value that is generated by multiplying the position of the tool axis supplied via the bus by the synchronization ratio, and the superimposition command, and generates a motion command for a workpiece axis corresponding to the one workpiece axis controller, the upper controller is configured to transmit first information to the plurality of workpiece axis controllers, the first information related to the workpiece axis corresponding to the one workpiece axis controller includes a flag to represent that the workpiece axis is a slave axis, and the first information related to remaining workpiece axes corresponding to remaining workpiece axis controllers among the plurality of workpiece axis controllers includes a flag to represent that the remaining workpiece axes are not slave axes.

3. A control device of a gear processing machine, the control device comprising:
- a tool axis motor that drives a tool axis;
- a tool axis controller that controls the tool axis motor;
- a tool axis position detection sensor that detects a position of the tool axis;
- a plurality of workpiece axis motors that drive a plurality of workpiece axes;
- a plurality of workpiece axis controllers that control the plurality of workpiece axis motors;
- an upper controller that is connected to the tool axis controller and the plurality of workpiece axis controllers; and
- a single bus that directly connects the tool axis controller and the plurality of workpiece axis controllers to communicate, wherein two workpiece axis controllers among the plurality of workpiece axis controllers are used to hold one workpiece together, the position of the tool axis detected by the tool axis position detection sensor is supplied to the two workpiece axis controllers via the bus, and the two workpiece axis controllers add a value that is generated by multiplying the position of the tool axis supplied via the bus by the synchronization ratio, and the superimposition command, and generate a motion command for a workpiece axis corresponding to the two workpiece axis controllers.

4. The control device of claim 1, wherein the upper controller is further configured to transmit second information to the workpiece axis controller, and the second information indicates that the tool axis is a master axis corresponding to the slave axis when the workpiece axis is the slave axis.

5. The control device of claim 4, wherein the workpiece axis controller is configured to receive the first and second information from the upper controller, in response to the first information indicating that the workpiece axis is the slave axis,
 read position data of the position of the tool axis directly from the tool axis controller via the bus, and
 generate the motion command for the workpiece axis to be a sum of (a) the superimposition command and (b) the value generated by multiplying the position of the tool axis by the synchronization ratio, and in response to the first information indicating that the workpiece axis is not the slave axis,
 set the position data to zero.

6. The control device of claim 2, wherein the upper controller is further configured to transmit second information to the plurality of workpiece axis controllers, and the second information indicates that the tool axis is a master axis corresponding to the slave axis.

7. The control device of claim 6, wherein each workpiece axis controller among the plurality of workpiece axis controllers is configured to receive the first and second information from the upper controller, in response to the first information including the flag to represent that the workpiece axis corresponding to said each workpiece axis controller is the slave axis,
 read position data of the position of the tool axis directly from the tool axis controller via the bus, and
 generate the motion command for the corresponding workpiece axis to be a sum of (a) the superimposition command and (b) the value generated by multiplying the position of the tool axis by the synchronization ratio, and in response to the first information including the flag to represent that the workpiece axis corresponding to said each workpiece axis controller is not the slave axis,
 set the position data to zero.

8. The control device of claim 3, wherein the upper controller is configured to transmit first information to the plurality of workpiece axis controllers, the first information related to two workpiece axes corresponding to the two workpiece axis controllers includes a flag to represent that the two workpiece axes are slave axes, and the first information related to remaining workpiece axes corresponding to remaining workpiece axis controllers among the plurality of workpiece axis controllers includes a flag to represent that the remaining workpiece axes are not slave axes.

9. The control device of claim 8, wherein the upper controller is further configured to transmit second information to the plurality of workpiece axis controllers, and the second information indicates that the tool axis is a master axis corresponding to both the slave axes.

10. The control device of claim 9, wherein each workpiece axis controller among the plurality of workpiece axis controllers is configured to receive the first and second information from the upper controller, in response to the first information including the flag to represent that the workpiece axis corresponding to said each workpiece axis controller is one of the slave axes, read position data of the position of the tool axis directly from the tool axis controller via the bus, and generate the motion command for the corresponding workpiece axis to be a sum of (a) the superimposition command and (b) the value generated by multiplying the position of the tool axis by the synchronization ratio, and in response to the first information including the flag to represent that the workpiece axis corresponding to said each workpiece axis controller is not any one of the slave axes, set the position data to zero.

* * * * *